March 10, 1931.     I. A. BAUM     1,795,326
CORNER CONNECTION FOR FRAMES
Filed March 14, 1930
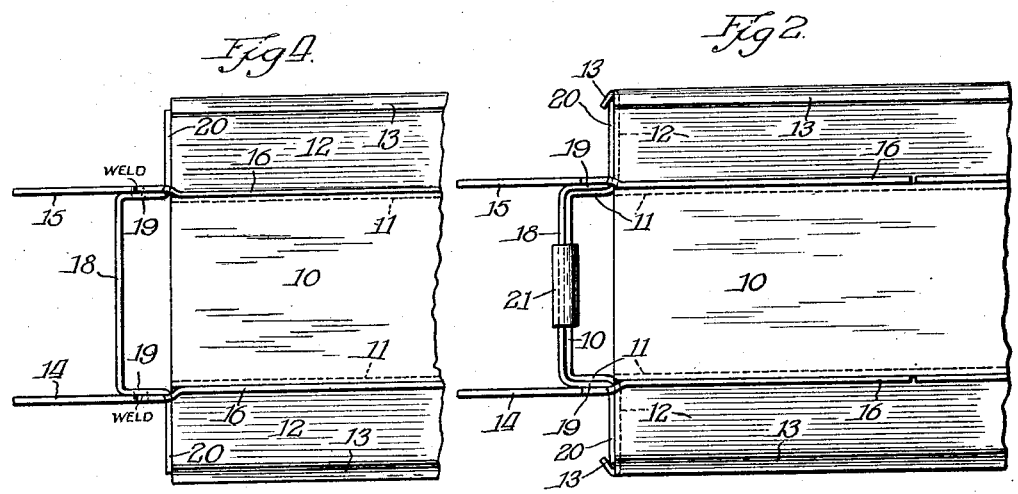
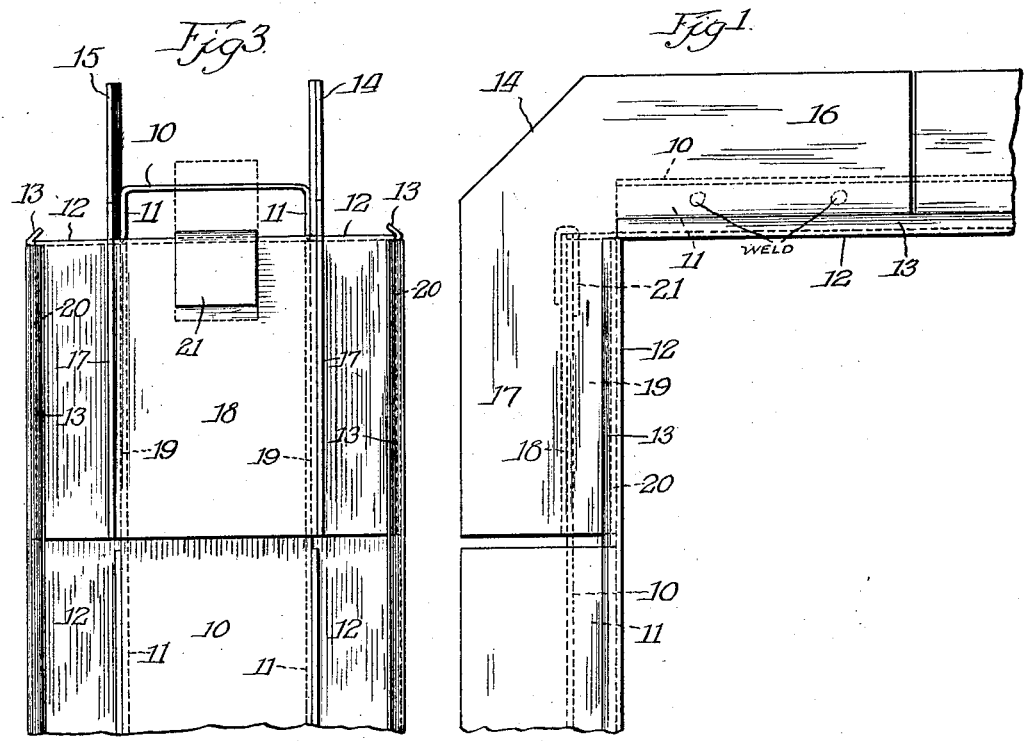
Inventor:
Isaac A. Baum Patented Mar. 10, 1931

1,795,326

UNITED STATES PATENT OFFICE

ISAAC A. BAUM, OF CHICAGO, ILLINOIS

CORNER CONNECTION FOR FRAMES

Application filed March 14, 1930. Serial No. 435,825.

My invention relates to building construction and particularly to a novel corner connection for door and window frames of metal construction.

An object of my invention is to simplify the construction of corner connections and to facilitate the manufacture of frames of this character which are intended to be constructed and shipped in knocked-down condition and assembled by the workmen. The elements of the device here described are extremely simple and comprise a pair of angularly disposed frame members, one having means providing an undercut recess or socket, together with a pair of L-shaped plates, one leg of each of which is welded to one frame member, the other leg lying alongside of the corresponding frame member; a channel joins the last named legs and is provided with flanges adapted to slidably cooperate with the undercut recesses in the frame member.

The invention will be more readily understood by reference to the accompanying drawings, in which—

Fig. 1 is a side elevation of a corner connection constructed in accordance with my invention;

Fig. 2 is a plan view thereof;

Fig. 3 is an end elevation; and

Fig. 4 is a plan view of the parts shown in Fig. 2 with the side frame member eliminated.

In the drawings, I have illustrated the end portions of head and side frame members with the means employed for effecting a sliding connection therebetween. The cross section of these frame members is identical, each consisting of a web 10, flanges 11 and margins 12, the edges 13 of the margins being rebent to provide an undercut recess or socket. Generally the function of the margin 12 and rebent edge 13 is to provide a plaster terminal and ground but at the corner this construction is utilized to provide a socket for use in the interlocking connection.

A pair of L-shaped plates 14—15 are provided, the horizontal legs 16 of which are welded to the outside faces of the flanges 11 of the channel frame. The vertical legs 17 lie alongside of the outside faces of the corresponding flanges of the side frame.

As a means for joining and stiffening the depending legs 17, I provide short channels having a web 18, flanges 19 and laterally projecting margins 20, the flanges 19 being welded to the legs 17. The margins 20 are positioned to snugly interfit with the undercut recesses formed by the rebent edges 13 of the plaster terminal, by a vertical sliding movement.

A readily bendable strip 21 is welded to the inside face of the web 10 of the side frame channel and is adapted to be hammered over the top edge of the web 18 of the connecting channel in order to hold the parts in their final position.

A construction such as described may be very simply constructed and its use insures a firm and rigid connection.

I claim:

1. A corner connection for metal frames comprising, in combination, a pair of angularly disposed frame members, one of which provides a socket, a pair of angle plates, one leg of each of which is fixed to one frame member and the other leg of each of which is adapted to lie in parallel relation to the other frame member, a short channel connecting the last named legs, and a projection from said channel adapted to enter said socket.

2. A corner connection for metal frames comprising, in combination, a pair of angularly disposed frame members, one of which provides a socket, a pair of angle plates, one leg of each of which is fixed to one frame member and the other leg of each of which is adapted to lie in parallel relation to the other frame member, a short channel connecting the last named legs, and flanges on said channel adapted to cooperate with said socket.

3. In combination, a pair of angularly disposed metal frame members of angular cross section and provided with marginal flanges having rebent edges providing an undercut recess, angle plates, one leg of each of which is secured to a side of one frame member, the other leg of each of which is adapted to lie alongside the other frame member, a channel secured to and joining said last named legs, and flanges on said channel adapted to slidably interfit with the undercut recesses in said frame members.

4. A corner connection for metal frames comprising, in combination, a pair of angularly disposed frame members, one of which provides a socket, a pair of angle plates, one leg of each of which is fixed to one frame member, and the other leg of each of which is adapted to lie in parallel relation to the other frame member, a short channel connecting the last named legs, a projection from said channel adapted to enter said socket, and a tongue secured to a frame member and adapted to be bent over the web of said short channel to hold the parts in final position.

In testimony whereof I have affixed my signature.

ISAAC A. BAUM.